United States Patent [19]

Roberts

[11] Patent Number: 4,782,622

[45] Date of Patent: Nov. 8, 1988

[54] TRAP-GUARD FOR VERMIN REPELLANT DESTRUCTION

[76] Inventor: Ernest H. Roberts, 119 Huntington Cir., Elyria, Ohio 44035

[21] Appl. No.: 123,310

[22] Filed: Nov. 20, 1987

[51] Int. Cl.$^4$ .......................................... A01M 25/00
[52] U.S. Cl. .................................. 43/131; 114/221 R
[58] Field of Search ...................... 43/131; 114/221 R

[56] References Cited

U.S. PATENT DOCUMENTS

| | | | |
|---|---|---|---|
| 1,052,547 | 2/1913 | Worthington | 114/221 |
| 1,060,993 | 5/1913 | Maynard | 43/131 |
| 1,373,597 | 4/1921 | Carey | 114/221 |
| 1,401,540 | 12/1921 | Konig | 114/221 |
| 1,486,417 | 3/1924 | Cheely | 114/221 |
| 2,325,616 | 8/1943 | Landweber | 114/221 |
| 2,525,234 | 10/1950 | Muche | 114/221 |
| 2,617,378 | 11/1952 | Osol | 114/221 |

Primary Examiner—M. Jordan
Attorney, Agent, or Firm—Mack D. Cook, II

[57] ABSTRACT

A trap-guard for vermin repellant destruction which may be molded from conventional plastic as a unitary structure and has a body, a central tube and a mounting means for a conventional chemical compound.

7 Claims, 3 Drawing Sheets

TRAP-GUARD FOR VERMIN REPELLANT DESTRUCTION

BACKGROUND OF THE INVENTION

The present invention relates to a trap-guard, for use on lines extending up from near ground to secure or connect to an object above ground or on water. The invention was made to provide a trap-guard with a deformable but unitary body structure selectively attachable along lines, ropes, hawsers, etc. The purpose of the invention is to repel or destroy rodent or insert vermin from using an available extended line to climb up and onto a movable object such as a boat on water or tarpaulin covered vehicle, etc., on land. The improved trap-guard is a composite structure precision molded from state of the art plastic compounds so as to have a long useful life.

The scope and content of the prior art has been determined as explained below.

U.S. Pat. No. 1,052,547, February, 1913, Worthington, discloses a rat trap for use on ship's hawsers. A trap has a rat or mouse proof receptacle mounted between a pair of identical disks. The disks are each divided into two parts 1 and 2 and each is hinged together at 3. The disks are each braced together by stays 4 and a covering piece 5 is inserted between each semi-disk 1 for protection of the hawser 6. A rat proof wired enclosure 7 has an aperture 8, rat race 9, and hinged drop door 10 at each end. Stops 11 on door 10 allowed opening to a predetermined point. Another door 12 for emptying purposes is formed in the side of the trap 7. A trap fixed in position on the hawser 6 is held firmly in place by a coiled spring 13 having a hook end 14 and a free end connected to a stay 4.

U.S. Pat. No. 1,060,993, May 1913, Maynard (filed before Worthington), provides a trap-guard with a "means whereby the entrapped animal is smeared with a poisonous material." Maynard has a wire trap 2 between identical disks 3, hinged at 4, with longitudinal internal brace bars 5 having grip members 6 thereon for enclosing a mooring hawser 22. The poison pad 26 extends longitudinally through the trap between end disks 3.

U.S. Pat. No. 1,373,597, April 1921, Carey, discloses a rat guard for ship's ropes comprising a pair of hingedly connected disk sections together forming a flattened cone.

U.S. Pat. No. 1,850,763, March 1932, Morley, discloses a mite trap with a disk plate 16 having a passageway 14 leading to the interior of a receptacle 10.

U.S. Pat. No. 2,233,832, March 1941, Byrd, discloses an insect guard with a coating 5 squeezed firmly against the mounting pipe so as to efect a tight seal.

U.S. Pat. 2,617,378, November 1952, Osol, shows a self-adjusting and locking rat guard for mooring lines wiht hub portions 4 and 5 for snugly surrounding the line 1.

U.S. Pat. No. 3,005,436, October 1961, Caldwell, shows a rat guard for ship hawsers with a resilient member 17 completing a seal around a hawser 28.

The above prior art references are understood to be from a search in Class 114, subclasses 221 and 221 R (including foreign and literature).

Other art of general interest for structural configururations (cone and cylindrical casings) includes: U.S. Pat. No. 1,005,530, October 1911, Fritsch (flytrap); U.S. Pat. No. 1,611,515, December 1926, Crown (fly trap and bug catcher ); U.S. Pat. No. 1,769,408 July 1930, Andrews (ant-poison, feeder); and U.S. Pat. No. 3,320,6982, May 1967, Hellen (lethal trapping device). These four patents are from a search in Class 43, subclasses 1, 107, 120, 121, 131, and 132.1.

SUMMARY OF THE INVENTION

It is an object of the present invention to provide an improved trap-guard with a deformable but unitary body structure.

It is a further object to provide a trap-guard for retaining and positioning, safely and without undue exposure to humans, toxic chemical compounds active to repel or destroy rodent or insect vermin.

Still further, it is an object to provide trap-guards, with replaceable rodent or insect vermin repelling or destroying chemical properties, which are precision molded from state of the art plastic compounds so as to have a long useful life.

These and other objects of the invention, and further advantages thereof, will be apparent in view of the detailed description and drawings.

In general, the improved trap-guard for use on a line, rope or hawser comprises a body, a central tube and a mounting means for a conventional vermin repellant-destruction chemical compound.

The trap-guard body is formed by mating sections interconnected by a pliable hinge to have a closed periphery. The body mating sections when closed together by fastening means have a closed (upper) end and an open (lower) end.

The trap-guard central tube extends axially through the body and is formed by mating sections interconnected with the closed (upper) ends of the body mating sections. The tube mating sections define when closed together by fastening means a cylindrical inner surface for enclosing the line, rope or hawser.

The trap-guard mounting means replacably positions a vermin repellant-destruction chemical compound within the interior of the body and near to the body open end and away from the central tube.

IN THE DRAWINGS

DETAILED DESCRIPTION OF THE INVENTION

Figure 1:
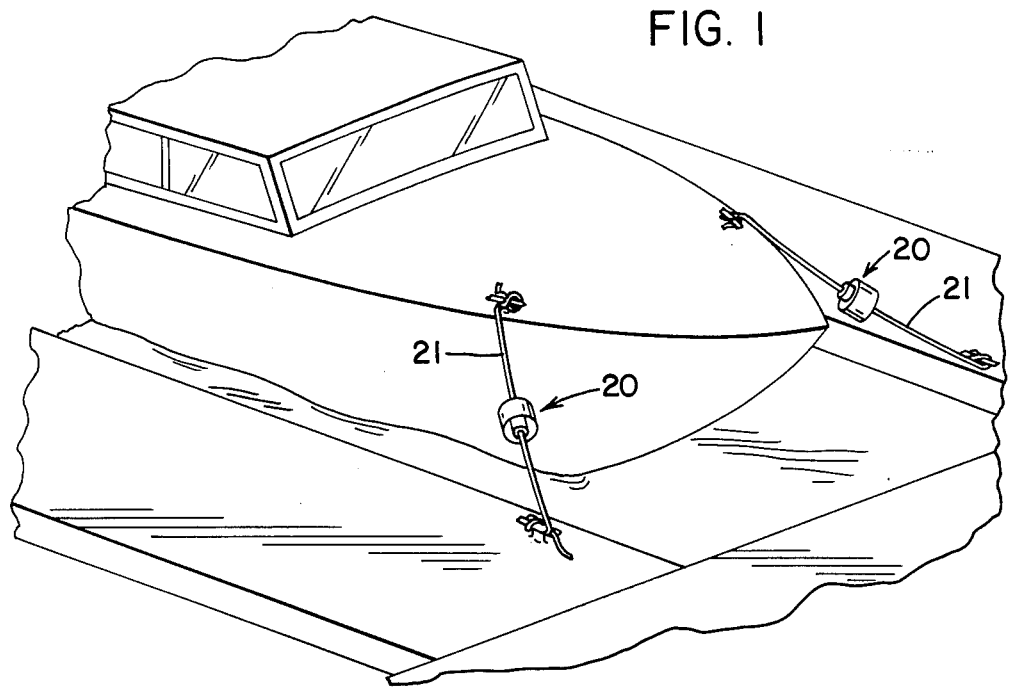
FIG. 1 is a view of two trap-guards according to the invention being used on mooring lines to secure a boat within a mooring slip.
Figure 2:
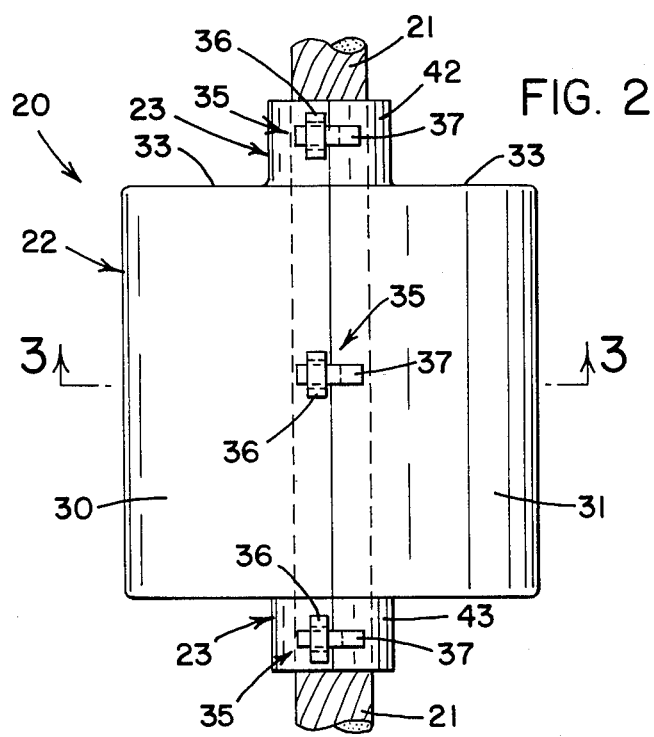
FIG. 2 is a full view of a trap-guard attached to a line, rope or hawser.
Figure 3:
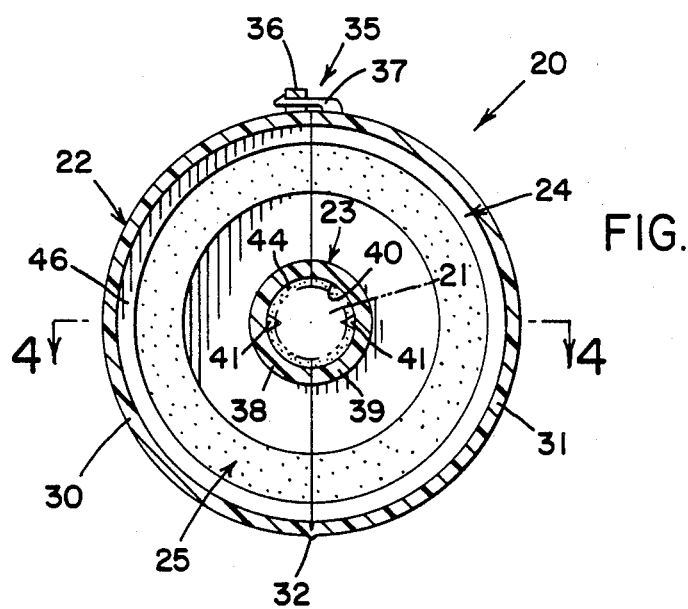
FIG. 3 is a cross-section of a trap-guard taken substantially as indicated on line 3—3 of FIG.2.
Figure 4:
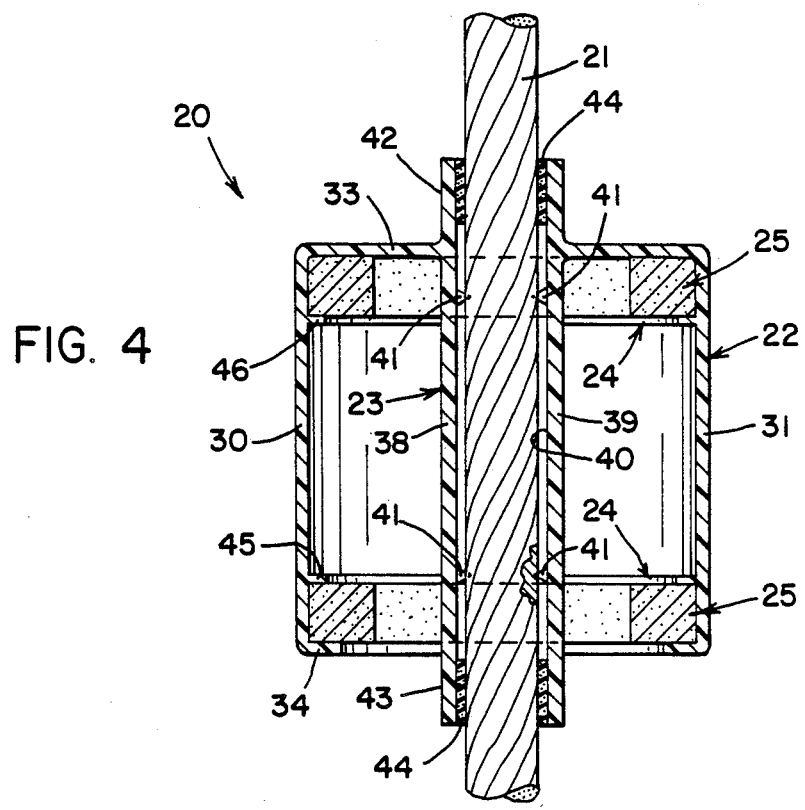
FIG. 4 is a full section of a trap-guard taken substantially as indicated on line 4—4 of FIG. 3; and, FIG. 5 is an isometric view of an opened trap-guard showing near identical mating halves connected by a pliable hinge.

An improved trap-guard according to the invention is referred to generally by the numeral 20. As shown in the enviromental view of FIG. 1, trap-guards 20 may be used dockside on lines, ropes or hawsers indicated at 21 to moor a boat. Trap-guards 20 are versatile and easily applied in any rodent and insect vermin environment where a line, rope or hawser extends from ground to an object.

A trap-guard 20 for mounting on a line 21 has a body referred to generally by the numeral 22, a central tube referred to generally by the numeral 23, and a mounting means referred to generally by the numeral 24 for a preformed vermin repellant-destruction chemical compound referred to generally by the numeral 25.

The trap-guard body 22 is formed by mating sections such as a pair of halves 30, 31 interconnected by an integrally formed pliable hinge 32 to have a closed periphery. As shown, the body 22 has a cylindrical periphery, although other closed periphery configurations such as square, polygonal, or pyrimidal could be provided therefor.

When closed together, the body mating sections will provide a trap-guard body 22 with an integrally formed closed (upper) end 33 and an open (lower) end surrounded by a retaining flange 34.

The body half sections 30, 31 are closed together around hinge 32 by a fastening means referred to generally by the numeral 35. As shown, each fastening means 35 is an integrally formed interfitting staple 36 and hasp 37 on opposed half sections 30 and 31.

The trap-guard central tube 23 extends axially through the body 22 nd is formed by mating sections such as a pair of halves 38, 39 interconnected and integrally formed with a closed (upper) end 33 of a body half section 30 or 31. When closed together by a fastening means 35, the tube halves 38, 39 will define a central tube 23 with a cylindical inner surface 40 to enclose a line 21. The tube inner surface 40 has gripping means indicated at 41 to releasably engage a line 21. As shown, the line gripping means 41 are a series of integrally formed radially inwardly projecting serrated or conincally tapered teeth.

The tube line halves 38, 39 are closed together around a line 21 by fastening means 35. The closed central tube 23 has one end (upper) 42 projecting beyond the body closed end 33 and an opposite (lower) end 43 projecting beyond the retaining flange 34 surrounding the body open (lower) end. the tube fastening means 35 may be an integrally formed interfitting staple 36 and hasp 37 on opposed tube ends 42 and 43.

The cylindrical inner surface 40 may have a predetermined diameter for varied size lines 21. In such an embodiment, a resilient spacer means indicated at 44 may be positioned or inserted with the projecting tube ends 42 and 43. The spacer means 44 will more securely grip or engage a line 21 and also prevent insect vermin from crawling up within the central tube and by passing the trap formed by the interior of the body 22.

The trap-guard mounting means 24 replacably positions a vermin repellant-destruction chemical compound 25 within the trap interior of the body 22, near to the body open end and retaining flange 34 and radially away from the central tube 23. An open (lower) end mounting means 24 may be the retaining flange 34 and a spaced-apart retaining ring 45 integrally formed on mating body havles 30 and 31. The flange 34-ring 45 will provide a pocket to receive a preformed donut or ring of chemical compound 25. As shown, there may also be a second closed (upper) end mounting means 24 provided by the closed end 33 and a spaced apart retaining ring 46 integrally formed on the body halves 30 and 31.

Figure 5:
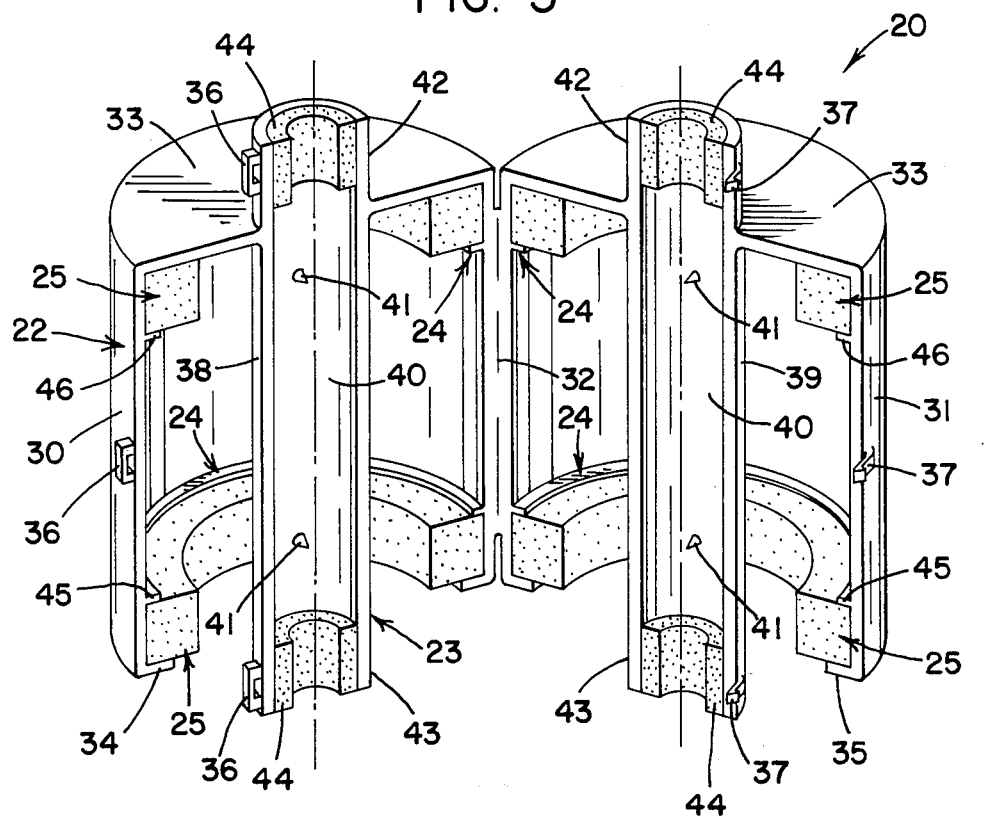

As shown, the vermin repellant-destruction chemical compound 25 held within the trap-guard body 22 by the retaining rings 45 or 46 may have a conventional or state of the art chemical composition. The chemicals plus additives, fillers or viscuous carriers or pastes may be molded per se in a suitable shape. Or, suitably shaped inert carriers may be impregnated with the chemical compounds. Whatever the composition or form of the chemical compound so chosen, the trap-guard 20 may be opened (as shown in FIG. 5) for insert or periodic replacement of the chemical compound 25 in mating sections or halves for engagement by the retaining rings 45 or 46.

What is claimed is:

1. A trap-guard for use on a line, rope or hawser for vermin repellant and destruction, said trap-guard comprising:

a body formed by mating sections interconnected by a pliable hinge to have a closed periphery, said body mating sections when closed together by fastening means having a closed end and an open end;

a central tube extending axially through said body and formed by mating sections interconnected with said closed ends of said body mating sections, said tube mating sections when closed together by fastening means defining a cylindrical inner surface for enclosing said line, rope or hawser; and, a mounting means for positioning a vermin repellant-destruction chemical compound within the interior of said body including a retaining flange surrounding said body open end and a spaced apart retaining ring integrally formed on said body mating sections.

2. A trap-guard according to claim 1, wherein said body has a cylindrical periphery and is formed by a pair of half sections.

3. A trap-guard according to claim 1 wherein said body mating sections are closed together by fastening means integrally formed with interfitting staples on one said section and hasps on another said section.

4. A trap-guard according to claim 1 wherein said central tube cylindrical inner surface has gripping means to releaseably engage said line.

5. A trap-guard according to claim 1 wherein said central tube has an end projecting beyond said body sections closed end and an opposite end projecting beyond said body sections open end.

6. A trap-guard according to claim 4 wherein said line gripping means are a series of integrally formed radially inward projecting teeth.

7. A trap-guard according to claim 5 wherein said tube projecting ends have resilient spacer means to securely grip said line and also prevent insect vermin from crawling up within said central tube.

* * * * *

UNITED STATES PATENT AND TRADEMARK OFFICE
CERTIFICATE OF CORRECTION

PATENT NO. : 4,782,622

DATED : November 8, 1988

INVENTOR(S) : Ernest H. Roberts

It is certified that error appears in the above-identified patent and that said Letters Patent is hereby corrected as shown below:

Col. 1, line 12, "insert" should read --insect--.

Col. 2, line 2, "3,320,6982" should read --3,320,692--.

Col. 3, line 24, "22 nd" should read --22 and--.

Col. 3, line 49, "by passing" should read --bypassing--.

Signed and Sealed this

Fourteenth Day of March, 1989

Attest:

DONALD J. QUIGG

Attesting Officer

Commissioner of Patents and Trademarks